(12) United States Patent
Silver et al.

(10) Patent No.: US 6,372,268 B1
(45) Date of Patent: Apr. 16, 2002

(54) WHEYLESS PROCESS FOR PRODUCTION OF NATURAL MOZZARELLA CHEESE

(75) Inventors: Richard Stuart Silver, Wilmette; Xiao-Qing Han, Naperville; Richard Lincourt, Mundelein; Maria Lucrecia Cardona, Chicago, all of IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

(21) Appl. No.: 09/863,183

(22) Filed: May 23, 2001

(51) Int. Cl.$^7$ ................................................ A23C 9/12
(52) U.S. Cl. ........................ 426/36; 426/34; 426/39; 426/40; 426/582
(58) Field of Search .............................. 426/34, 36, 38, 426/39, 40, 580, 582

(56) References Cited

U.S. PATENT DOCUMENTS

| | | |
|---|---|---|
| 3,117,008 A | 1/1964 | Mauk |
| 4,075,360 A | 2/1978 | Rule et al. |
| 4,244,971 A | 1/1981 | Wargel et al. |
| 4,518,616 A | 5/1985 | Czulak |
| 4,919,943 A | 4/1990 | Yee et al. |
| 5,030,470 A | 7/1991 | Kielsmeier et al. |
| 5,104,675 A | 4/1992 | Callahan et al. |
| 5,200,216 A | 4/1993 | Barz et al. |
| 5,234,700 A | 8/1993 | Barz et al. |
| 5,567,464 A | 10/1996 | Barz et al. |
| 5,714,182 A | 2/1998 | Bisson et al. |
| 5,851,577 A | 12/1998 | Brenton et al. |
| 5,882,704 A | 3/1999 | Yamaguchi et al. |
| 5,902,625 A | 5/1999 | Barz et al. |
| 5,925,398 A | 7/1999 | Rizvi et al. |
| 6,015,579 A | 1/2000 | Sanchelima |

FOREIGN PATENT DOCUMENTS

WO  00/27214  5/2000

OTHER PUBLICATIONS

Thompson, M.P., AN 79(04):P0606 FSTA, abstracting Food Engineering International, 1978, 3(7), 25.*
"Soft Italian Cheese —Mozzarella and Ricotta", *Cheese and Fermented Milk Foods*, vol. II, Ch. 7, pp. 61–71.

* cited by examiner

Primary Examiner—Leslie Wong
(74) Attorney, Agent, or Firm—Fitch, Even, Tabin & Flannery

(57) ABSTRACT

The present invention provides a wheyless process for preparing natural mozzarella cheese using dry dairy ingredients. This process enables the manufacture of cheese from non-perishable or shelf-stable ingredients such as dried milk protein concentrate and anhydrous milkfat. This enables greater flexibility in the location of cheese manufacturing facilities as handling and/or transporting large quantities of fresh milk is not required. Also, in utilizing such a process, the need for refrigerated storage of the fresh milk would be minimal. The dry dairy ingredients used in the present invention comprise milk protein concentrates and blends of milk protein concentrates with up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof.

36 Claims, 2 Drawing Sheets

WHEYLESS PROCESS FOR PRODUCTION OF NATURAL MOZZARELLA CHEESE

FIELD OF THE INVENTION

The present invention generally relates to methods for preparing mozzarella cheese. More specifically, the present invention relates to wheyless processes for preparing natural mozzarella cheese using dry dairy ingredients.

BACKGROUND OF THE INVENTION

Traditional mozzarella cheese is made by treating buffalo or bovine milk, either full or reduced fat, with chymosin or similar enzymes, then acidifying with lactic acid bacterial cultures or vinegar so as to form curds and whey. After separation from the whey, the curd is traditionally processed by a pasta filata system utilizing heat and mechanical working to impart the desirable "chicken breast" mozzarella texture. Traditional methods, while producing an excellent finished product, have the disadvantage of being relatively time consuming. Moreover, valuable milk proteins are lost in the whey and pasta filata immersion fluids. Adding further to costs, the removal of whey requires further processing for conversion into secondary products or treatment prior to disposal. Finally, there is a significant financial and logistical burden associated with the use of fluid milk since large quantities of fresh milk must be shipped and stored under refrigerated conditions.

It is well known in the prior art to produce a processed mozzarella cheese having some of the attributes of natural cheese; such processed cheese may be substituted for natural cheese in some applications. Processed mozzarella cheese can be made using conventional mozzarella cheese curd, a proteinaceous ingredient (e.g., casein, caseinates, and milk protein concentrates) and a fat source (e.g., butterfat, cream, or vegetable oil) cooked in the presence of significant levels of emulsifying salts (e.g., sodium phosphates, sodium citrates, and the like). However, such process mozzarella cheese, in addition to compositional differences, does not have the desired textural or flavor attributes normally associated with natural mozzarella. Moreover, although the manufacture of processed mozzarella does not produce whey, the process utilizes traditional mozzarella curd which does require whey removal. Therefore, the processing costs associated with whey removal are not avoided.

It is also well known in the art to produce cheeses from concentrated fluid milk. For example, PCT Patent Publication WO 00/27214 (published May 18, 2000) describes a process to produce cheese. For example, a mozzarella cheese was produced by treating whole liquid milk with acid to adjust the pH to about 5 to about 6.8 prior to ultrafiltration and diafiltration. The mixture was then salted and optional enzymes were added. The mixture was incubated for three hours and then transferred to a cooker and mechanically worked. Unsalted butter and milk protein isolate (or calcium caseinate) were added with increased agitation. After adjustment of the pH to about 5, an enzyme modified cheese blend was added for flavor.

The current invention provides a mozzarella cheese with very similar textural, flavor, melt, and compositional attributes as compared to conventionally prepared natural mozzarella. The mozzarella cheese of the present invention is prepared using a process which utilizes dry dairy raw materials and avoids both the costly refrigeration transportation of fresh milk and the costly processing requirements of whey removal.

SUMMARY OF THE INVENTION

Figure 1:
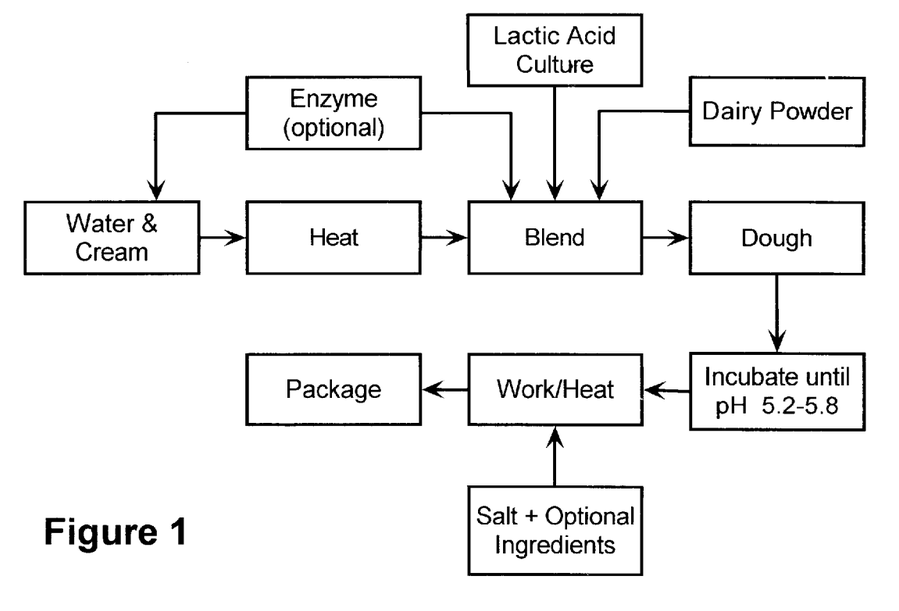
FIG. 1 is a flowchart illustrating an embodiment of the present invention using a lactic acid culture.

The present invention provides a method of preparing mozzarella cheese from dry dairy ingredients. In one embodiment as illustrated in FIG. 1, the present invention provides a method for preparing mozzarella cheese from dry dairy ingredients, said method comprising:

(1) mixing water and a dairy fat to form a first blend;

(2) adding a lactic acid-producing culture to the first blend to form a second blend;

(3) mixing a dry dairy ingredient with the second blend to form a cultured dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(4) incubating the cultured dough at a temperature and for a time sufficient to obtain a pH of about 5.2 to about 5.8;

(5) mechanically working and cooking the cultured dough from step (4) in a cooker at a temperature of about 150 to about 175° F. and under relatively low shear conditions to form the mozzarella cheese; and (6) collecting the mozzarella cheese, wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process. Preferably, the dairy fat is cream, liquid or anhydrous milkfat, butter, or mixtures thereof; generally the dairy fat selected is based on prevailing market conditions and availability. Optionally, a proteolytic enzyme (e.g., chymosin) and/or a microbial or plant-derived enzyme having similar activity can be incorporated into the first or the second blend. Other optional ingredients such as salt, stabilizers, gums, preservatives, supplements, condiments, and the like may be incorporated into the cheese; such optional ingredients are preferably added prior to, or during, the working and cooking step.

Figure 2:
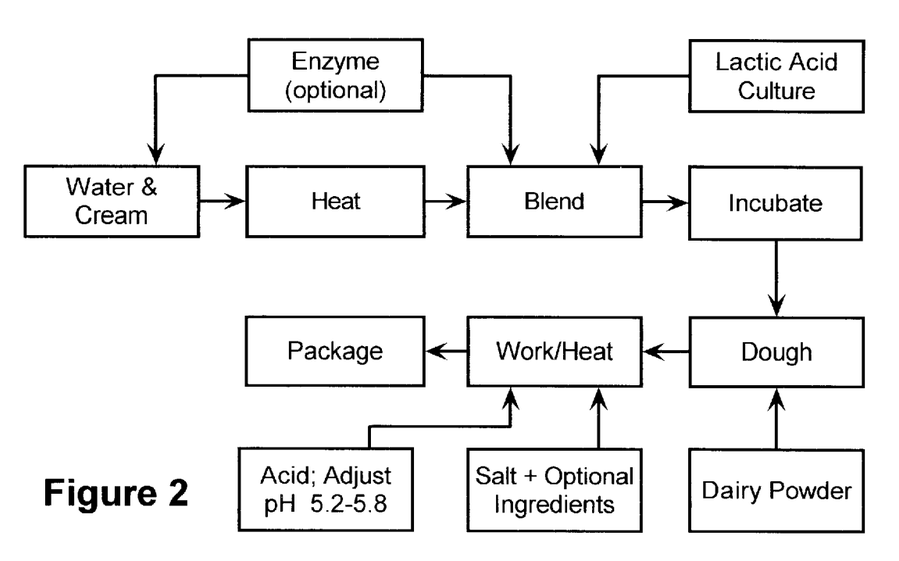
FIG. 2 is a flowchart illustrating another embodiment of the present invention using a lactic acid culture.

In another embodiment as illustrated in FIG. 2, the present invention provides a method for preparing mozzarella cheese from dry dairy ingredients, the method comprising:

(1) mixing water and a dairy fat to form a first blend;

(2) adding a lactic acid-producing culture to the first blend to form a second blend;

(3) incubating the second blend at a temperature and for a time sufficient to obtain a pH of about 4 to about 5 to form a cultured second blend;

(4) mixing a dry dairy ingredient with the cultured second blend to form a dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(5) mechanically working and cooking the dough from step (4) in a cooker at a temperature of about 150 to about 175° F. and under relatively low shear conditions while adding sufficient edible acid to adjust the pH to about 5.2 to about 5.8 to form the mozzarella cheese; and (6) collecting the mozzarella cheese, wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process. Preferably, the dairy fat is cream, liquid or anhydrous milkfat, butter, or mixtures thereof; generally the dairy fat selected is based on prevailing market conditions and availability. Optionally, a proteolytic enzyme (e.g., chymosin) and/or a microbial or plant-derived enzyme having similar activity can be incorporated into the first or the second blend. Other optional ingredients such as salt, stabilizers, gums, preservatives, supplements, condiments, and the like may be incorporated into the cheese; such optional ingredients are preferably added prior to, or during, the working and cooking step.

Figure 3:
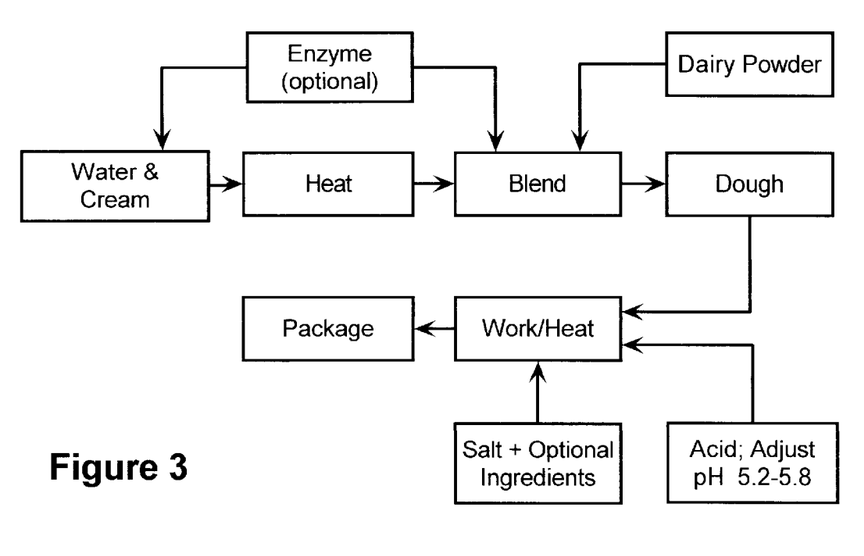
FIG. 3 is a flowchart illustrating another embodiment of the present invention using acid addition.

In another embodiment as illustrated in FIG. 3, the present invention provides a method for preparing mozzarella cheese from dry dairy ingredients, said method comprising:

(1) mixing water and a dairy fat to form a blend;

(2) mixing a dry dairy ingredient with the blend to form a dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(3) mechanically working and cooking the dough in a cooker at a temperature of about 150 to about 175° F. and under relatively low shear conditions while adding sufficient edible acid to adjust the pH to about 5.2 to about 5.8 to form the mozzarella cheese; and (4) collecting the mozzarella cheese, wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process. Preferably the dairy fat is cream, liquid or anhydrous milkfat, butter, or mixtures thereof; generally the dairy fat selected is based on prevailing market conditions and availability. Preferably the edible acid added during the mechanical working and cooking step is vinegar or lactic acid. Optionally, a proteolytic enzyme, including those of animal (e.g., chymosin), plant, and/or microbial origin, can also be incorporated into the water and cream mixture and/or the blend for texture modification. If such an optional enzyme is used, a separate incubation step (about 60 to about 90° F. for about 0.5 to about 2 hours) can be used; normally, however, the time period between the blending step and the cooking step in a normal manufacturing process is sufficiently long so that incubation can occur and a separate incubation step is not required. Other optional ingredients such as salt, stabilizers, gums, preservatives, supplements, condiments, and the like may be incorporated into the cheese; such optional ingredients are preferably added prior to, or during, the working and cooking step.

A principal advantage of the current invention is that it enables the manufacture of cheese from non-perishable or shelf-stable ingredients such as dried milk protein concentrate and anhydrous milkfat. This enables greater flexibility in the location of cheese manufacturing facilities as handling and/or transporting large quantities of fresh milk is not required. Also, in utilizing such a process, the need for refrigerated storage of the fresh milk would be minimal. The dry dairy ingredients used in the present invention comprise milk protein concentrates and blends of milk protein concentrates with up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof. More preferably, the dry dairy ingredient used in the present invention consists essentially of about 80 to 100 percent milk protein concentrate and 0 to about 20 percent of a second dry dairy ingredient selected from the group consisting of whey protein concentrate, whey protein isolate, calcium caseinate, sodium caseinate, rennet casein, acid casein, nonfat dry milk, and mixtures thereof. An especially preferred dry dairy ingredient for use in the present invention is about 80 to about 90 percent milk protein concentrate and about 10 to about 20 percent rennet casein. The dry ingredients of the present invention can be used as dry powders or can be reconstituted with water prior to use. In an important aspect of the invention, the milk protein concentrate should have a solubility of greater than about 50 percent and a whey protein content of less than about 15 percent in order to obtain mozzarella cheese with acceptable texture and flavor. For purposes of this invention, a whey protein content of a specified value refers to the fraction of total crude protein rather than the total composition; in other words, a whey protein content of less than about 15 percent means that, of the total protein content of the composition, less than 15 percent consists of whey protein. Preferably, the milk protein concentrate has an average particle size of less than about 250 microns. Preferably, the second dry dairy ingredient also has a relatively high solubility (i.e., about 50 percent or higher) and/or a relatively small particle size (i.e., less than about 100 microns).

Another advantage of the current invention is that supplements, condiments, other foods, or combinations of these or other ingredients may be easily incorporated into the cheese during the mechanical working step, thus eliminating the need for a separate manufacturing step. For example, ingredients such as calcium supplements or soy protein isolate can readily be incorporated into the dough mass prior to, or during, cooking in order to prepare calcium-fortified or soy-protein fortified cheeses as desired. Similarly, food ingredients and condiments such as vegetables, spices, and the like can be readily incorporated into the mozzarella cheese of the present invention.

DETAILED DESCRIPTION OF THE INVENTION

The present invention relates to a method for producing a mozzarella cheese utilizing highly soluble milk protein concentrates. More particularly, the milk protein concentrate should have a solubility of at least about 50 percent and a whey protein content of less than about 15 percent. Milk protein concentrates lacking these characteristics are not acceptable (i.e., the resulting cheese will generally have a grainy or gritty texture and will lack the desirable "chicken breast" texture characteristic of mozzarella cheese). Preferably, the milk protein concentrate has a solubility of at least about 80 percent and a whey protein content of less than about 10 percent. A particular advantage of the invention is that the process may be carried out using dry dairy ingredients.

As noted, the milk protein concentrate used in the present invention should have a solubility of more than about 50 percent and a whey protein content less than about 15 percent. For purposes of this invention, solubility can be measured using conventional techniques such as, for example, described in Moore et al., "Collaborative Study to Develop a Standardized Food Protein Solubility Procedure," J. Food Sci., 50, 1715 (1985), which is incorporated by reference. Typical milk protein concentrates are made by membrane ultrafiltration of skim (or whole) milk to remove water, lactose and salts. Diafiltration with water may be used to further reduce the lactose and salt levels. Essentially all of the casein and whey proteins (and fat, if present) are retained in the retentate by a membrane with a 10,000 molecular weight cut-off. For use in the present invention, a preferred retentate should contain casein and whey protein in the ratio of no more than about 85 to about 15. Preferably, such retentate can be obtained using microfiltration membranes (e.g., ceramic membranes having about 0.1 micron pore diameter). Such membranes, depending on pH, temperature, and other operating conditions, permit whey proteins to pass through the membrane while retaining most or essentially all of the casein; thus, retentates enriched in casein and depleted in whey protein can be obtained. The retentate may be used in the wet state to make cheese, or it may be spray-dried to yield a shelf-stable powder which can be rehydrated for later use.

In addition to having a solubility of greater than about 50, the milk protein concentrates of this invention must have whey protein levels less than about 15 percent. In other words, less than 15 percent of the total protein in the milk protein concentrate should be whey protein. In order to provide mozzarella cheese with proper textural attributes, it has been determined that milk protein concentrates should contain no more than about 15 percent whey protein and, more preferably, should contain 0 to about 12 percent whey protein. Such milk protein concentrates may be produced by microfiltration or a combination of ultrafiltration and microfiltration. Other methods which could be used to provide such milk protein concentrates include, for example, size exclusion chromatography, ion exchange chromatography, electrophoresis, and high pressure carbon dioxide treatment (see, e.g., Tomasula et al., J. Food Sci., 65, 227 (2000); generally, however, such methods are not currently available in sufficient scale to justify their use in industrial cheese-making operations. Without being bound by theory, it is believed that whey protein above about 15 percent interferes with the alignment of casein molecules into the fibers required for good mozzarella texture.

FIGS. 1, 2, and 3 illustrate several embodiments of the present invention. These embodiments mainly differ in the acidifying or coagulating agent used and the point in the process in which an acidifying or coagulating agent is added. The processes illustrated in FIGS. 1 and 2 use a lactic acid-producing culture as the acidifying or coagulating agent. The process illustrated in FIG. 3 uses an edible acid as the acidifying agent. The embodiments in FIGS. 1 and 2 differ mainly in the point in the process in which the dry dairy powder is added. In the FIG. 1 process, the dry dairy powder is added to the blend to form the dough and the dough is then incubated. In the FIG. 2 process, the dry dairy blend is added to the incubated water and cream mixture in order to form the dough; in some cases, it may be easier, depending on the equipment available, to incubate a liquid mixture (FIG. 2) versus a dough mixture (FIG. 1).

The mozzarella cheese of this invention does not contain significant levels of added emulsifying salts. In other words, emulsifying salts, if added at all, are only added at relatively low levels (i.e., generally at levels of about 0.5 percent or less); such low levels are significantly below the levels normally associated with process cheese. Such emulsifying salts, if added, are present at levels sufficient to act as processing aids. Generally, it is preferred that emulsifying salts are not added since they tend to produce textural and melt properties characteristics similar to process cheese rather than the desired natural mozzarella cheese.

As noted, a preferred embodiment of the process of the present invention is illustrated in FIG. 1 wherein a lactic acid-producing culture is used as the acidifying or coagulating agent. A homogeneous mixture of water and a dairy fat, typically containing about 25 to about 40 percent milkfat and about 60 to about 75 percent water, is prepared at a temperature of about 60 to 110° F. in a suitable mixing vessel. For low- or reduced-fat varieties, the homogenous mixture of water and a dairy fat will typically contain about 25 to about 30 percent milkfat and about 70 to about 75 percent water. The source of dairy fat can be commercial pasteurized cream (about 35 to about 45 percent milkfat), anhydrous milkfat, butter, or mixtures thereof; generally the dairy fat selected is based on prevailing market conditions and availability. If desired, this mixture may be further stabilized by passing through a homogenizer at a pressure of about 200 psi or higher. A lactic acid-producing culture or mixture of lactic acid-producing cultures is added at a concentration of about 0.01 to about 2 percent with mixing. Suitable lactic acid-producing cultures are well known in the cheese-making art and include, for example, mesophilic cultures such as *Lactococcus lactis* and *Lactococcus cremoris* and thermophilic cultures such as *Streptococcus thermophilus, Lactobacillus helveticus*, and *Lactobacillus bulgaricus*. In addition to the use of bulk cultures, both mesophilic and thermophilic cultures may be conveniently added as "direct vat set" (DVS) cultures since they are more concentrated than the bulk cultures. Such DVS cultures are typically added at the rate of 0.01 to 0.1 percent. Examples of suitable DVS cultures include, for example, thermophilic cultures such as Yofast 15, Stc4, Stc7, IT1 and LH32, and the like; and mesophilic cultures such as R603 and CHN322 (all from Chr. Hansen, Inc., Milwaukee, Wis.).

Animal-, plant-, or microbial-derived proteolytic enzymes can also be added to the lactic-acid producing culture-containing composition if desired in order to modify the textural characteristics of the resulting mozzarella cheese. Suitable animal-derived proteolytic enzymes are well-known in the cheesemaking art and include, for example chymosin (veal rennet, SKW Biosystems, Waukesha, Wis.) and pepsin (SKW Biosystems, Waukesha, Wis.). Suitable microbial proteolytic enzymes include Chymax 2X (Chr. Hansen, Milwaukee, Wis.), Maxiren (Gist Brocades, Delft, Netherlands), and Fromase (Gist Brocades, Delft, Netherlands). Suitable plant derived enzymes which may be used include bromelain and papain (Enzyme Development Corp., NY). These enzymes, if used, are generally added at about 0.0001 to 0.1 percent.

The dry dairy ingredient or powder is then added with stirring at a level of about 25 to about 30 percent; stirring is continued until the powder is uniformly wetted to form a plastic "dough." The dry dairy ingredient generally contains about 80 to 100 percent milk protein concentrate and 0 to about 20 percent of one or more other dry proteinaceous dairy ingredients. The milk protein concentrate should have a solubility of at least about 50 percent and a whey protein content of less than about 15 percent. Suitable commercially available milk protein concentrates include, for example, Nutrilac CH7813 (ARLA Foods, Skanderborgvej, Denmark), Promilk 852B (Ingredia Dairy Ingredients, Arras Cedex, France), and Kerry RD4003-73B (Kerry Food Ingredients, Beloit, Wis.).

By way of illustration, a suitable milk protein concentrate for use in the present invention could be made using the following generally procedure. Skim milk is heated to about 120° F. and acidified with food-grade hydrochloric acid to a pH of about 5.8. The acidified milk is microfiltered on a 0.1 micron ceramic membrane (Tetra-Pak, Vernon Hills, Ill.) with continuous recycle at about 120° F. until the total solids in the retentate has increased to about 25 percent. The mixture is then diafiltered using water at about 120° F. until the lactose content of the retentate is below about 15 percent of total solids. Preferably, food-grade sodium hydroxide is added to the diafiltration water in sufficient quantity to adjust the pH of the retentate after diafiltration to about 6.5. While the initial skim milk contains casein and whey protein in the ratio of about 80:20, expressed as percent of total protein, the retentate has a casein/whey protein ratio of greater than 85:15 and preferably greater than 90:10. Although the liquid retentate can be used, it is generally preferred that it is spray dried using conventional techniques to provide a dry powder (e.g., moisture content of about 4 percent) with a solubility greater than about 50 percent and preferably greater than about 80 percent.

The second dry dairy ingredient is preferably selected from the group consisting of whey protein concentrate, whey protein isolate, calcium caseinate, sodium caseinate, rennet casein, acid casein, nonfat dry milk, and mixtures thereof. Preferred blends of milk protein concentrate and the second dry dairy ingredient include, for example, a blend of 80 percent Nutrilac CH7813 and 20 percent calcium caseinate (e.g., Alanate 380 from New Zealand Milk Products, Santa Rosa, Calif.) and another blend of 93.5 percent Nutrilac CH7813 and about 6.5 percent whey protein concentrate (e.g., AMP800 from AMPC Inc., Ames, Iowa).

The dough is held at a temperature and for a time sufficient to allow the pH to drop to about 5.2 to about 5.8. The temperature required depends, in part, on the specific acidifying agent used. Thus, for example, if the acidifying agent is a thermophilic lactic acid-producing culture, a temperature of about 95 to about 120° F., and preferably about 104 to about 110° F., is acceptable. If the acidifying agent is a mesophilic lactic acid-producing culture, a temperature of about 65 to about 95° F., and preferably about 72 to about 86° F., would be acceptable. Typically, using these acidifying agents and temperatures, the pH will reach the desired level in about 3 to about 5 hours. The pH drop is due to the action of the culture which converts lactose to lactic acid (plus flavor components). Once the pH reaches the desired level, the dough is mechanically worked and heated to achieve the desired texture. A typical device that can be used is a "laydown cooker" (e.g., Damrow, Fond du Lac, Wis.) having a single auger or twin-screw augers for mechanically working the cheese and steam jets for directly heating the cheese. Generally, the shear should be relatively low since excessive shear (i.e., about 100 sec$^{-1}$ or higher) can impair the texture of the resulting cheese and even, in some cases, result in phase separation. Shear serves several important functions during the cooking step. For example, it tends to form and align casein fibers to form the desirable fibrous "chicken breast" structure associated with mozzarella cheese. Shear also assists in dispersing and evenly distributing various components such as fat, moisture, salt, supplements, other optional ingredients, and the like throughout the cheese mass. Using either indirect or direct (i.e., steam injection) heating, shear also assists in heat transfer. Excessive shear, however, may have detrimental effects, including as noted texture impairment and/or phase separation. It is important, therefore, to adjust the shear during cooking to promote such desirable effects while minimizing the potentially detrimental effects.

The amount of desirable shear will vary depending on a number of factors, including for example, the composition of the cheese, the cooking conditions, and the cooker used. One of ordinary skill in the art can empirically determine appropriate shear levels for a given composition and make the appropriate adjustments. Generally, peak shear values of less than about 20 sec$^{-1}$ are acceptable and preferred for compositions containing insignificant levels of non-proteinaceous hydrocolloids and/or relatively low levels of total protein (i.e., less than about 20 percent). For compositions containing non-proteinaceous hydrocolloids and/or relatively high levels of total protein (i.e., greater than about 20 percent), peak shear levels of about 30 to about 50 sec$^{-1}$ are generally preferred. Using a conventional pilot-plant scale laydown cooker with a capacity of about 40 lbs, an auger speed of less than about 70 rpm, and more preferably about 50 to 60 rpm, will normally avoid excessive shear; of course, other sized cookers or changes in the cheese composition may require different operating conditions to avoid such excessive shear.

Salt, as well as optional ingredients, can added to the cheese in the cooker. Salt is normally added in the amount of about 1 to about 2.5 percent, and more preferably at about 1.5 to about 1.8 percent. If appropriate, additional water may be added to the cooker to adjust the moisture content of the final cheese. If direct steam heating is used, the resulting condensate generally increases the moisture content of the cheese by about 3 to about 6 percent; this added moisture must be taken into account in achieving the desired final moisture content.

Optional ingredients which may be added to the cooker include, for example, hydrocolloid gums (including, but not limited to, sodium carboxymethylcellulose, sodium alginate, konjac gum, carrageenan, xanthan gum, modified food starch, and the like) at about 0.1 to about 1 percent; flavors, both natural and compounded, at about 0.05 to about 2 percent; colorants at about 0.05 to about 2 percent; preservatives or anti-microbials (e.g., sorbic acid, potassium sorbate, benzoic acid, other food-grade acids, salt, essential oils, natural anti-microbial substances (e.g., nisin, nystatin, cultured milk, cultured whey), and the like) at about 0.05 to about 0.25 percent; minerals, vitamins, and other supplements (e.g., calcium, vitamin A, and the like) at about 0.01 to about 1 percent. For example, a calcium-fortified mozzarella cheese can be prepared using the addition of tricalcium phosphate, calcium phosphate, calcium carbonate, calcium sulfate, calcium citrate, and the like as well as mixtures thereof; and a soy-protein fortified cheese could be prepared using the addition of soy protein isolate. Similarly, food ingredients and condiments such as vegetables, spices, and the like can be readily incorporated into the mozzarella cheese of the present invention.

The cheese is cooked to about 150 to about 175° F., and more preferably to about 155 to about 160° F., with continuous mixing and working. The cheese is held at this temperature for about 1 to about 4 minutes, preferably about 2 minutes, to achieve the desired texture. Textural properties can be measured using conventional techniques and equipment (e.g., Texture Analyzer from Stable Micro Systems, London, England). The resulting mozzarella cheese is then collected and packaged using conventional techniques. For example, the mozzarella cheese can be hot-packed in tubs, lined boxes, or other suitable containers; it can be chill-rolled and cold packed; or it can be packaged using a mechanical pumping or extrusion device (e.g., "Polar Pump" (Polar Process Inc., Plattsville, Ont.) or Handtmann (Handtmann Inc., Buffalo Grove, Ill) extruder) in order to further work the cheese, modify its texture, and extrude it into various desired shapes (e.g., rods, balls, shreds, animal-shapes, stars, letters, and the like). In a preferred process, the hot mozzarella cheese (about 150 to about 175° F.) is cooled to about 80 to about 120° F. using, for example, a swept surface heat exchanger, a chilled roller, or a similar cooling device and then extruded into desired shapes (e.g., bars, rods, and the like) or into shreds. The resulting extruded cheese can then be further cooled using, for example, a cooling tunnel or a similar cooling device and then packaged.

A modified embodiment of the present invention is shown in FIG. 2. This embodiment also uses a lactic-acid producing culture to achieve the desired pH; in this embodiment, however, the water and cream mixture is incubated to a pH of about 4 to about 5 prior to the addition of the dairy powder to form the dough. Depending on the equipment available, it may be easier to include the liquid water and cream mixture of this embodiment as opposed to incubation of the dough in the FIG. 1 embodiment. Since the dairy powder is not exposed to the incubation step, supplemental acid addition, preferably during the working/heating step, may be needed to adjust the final pH to the desired about 5.2 to about 5.8 range. Otherwise, the process is carried out in a manner similar to that described above for FIG. 1.

Another embodiment of the present invention is shown in FIG. 3. This embodiment relies upon the addition of an edible acid, rather than a lactic-acid producing culture, to achieve the desired pH. A homogeneous mixture of water and a dairy fat, typically containing about 25 to about 40 percent milkfat and about 60 to about 75 percent water, is prepared at a temperature of about 60 to 110° F. in a suitable mixing vessel. For low- or reduced-fat varieties, the homogenous mixture of water and a dairy fat will typically contain about 25 to about 30 percent milkfat and about 70 to about 75 percent water. The source of dairy fat can be commercial pasteurized cream (about 35–45 percent milkfat), anhydrous milkfat, butter, or mixtures thereof; generally the dairy fat selected is based on prevailing market conditions and availability. If desired, this mixture may be further stabilized by passing through a homogenizer at a pressure of about 200 psi or higher.

The dry dairy ingredient or powder is then added with stirring at a level of about 20 to about 32 percent; stirring is continued until the powder is uniformly wetted to form a plastic "dough." The dry dairy ingredient generally contains about 80 to 100 percent milk protein concentrate and 0 to about 20 percent of one or more other dry proteinaceous dairy ingredients, both as described above. The milk protein concentrate should have a solubility of at least about 50 percent and a whey protein content of less than about 15 percent. The second dry dairy ingredient is preferably selected from the group consisting of whey protein concentrate, whey protein isolate, calcium caseinate, sodium caseinate, rennet casein, acid casein, nonfat dry milk, and mixtures thereof.

The dough is mechanically worked and heated to achieve the desired texture. A typical device that can be used is a "laydown cooker" (e.g., Damrow, Fond du Lac, Wis.) having a single auger or twin-screw augers for mechanically working the cheese and steam jets for directly heating the cheese. Generally and as noted above, the shear should be relatively low (i.e., less than about 100 sec-1) since excessive shear can impair the texture of the resulting cheese. Generally, peak shear values of less than about 20 $sec^{-1}$ are acceptable and preferred for compositions containing insignificant levels of non-proteinaceous hydrocolloids and/or relatively low levels of total protein (i.e., less than about 20 percent). For compositions containing non-proteinaceous hydrocolloids and/or relatively high levels of total protein (i.e., greater than about 20 percent), peak shear levels of about 30 to about 50 $sec^{-1}$ are generally preferred. For example, the auger speed of a conventional pilot-plant scale laydown cooker with a capacity of about 40 lbs will generally be less than about 70 rpm, and more preferably about 50 to 60 rpm, to avoid excessive shear; of course, other sized cookers may require different operating conditions to avoid such excessive shear. During the working and cooking step, an edible acid is added in an amount sufficient to achieve a pH of about 5.2 to about 5.8. Suitable edible acids include, for example, acetic acid, citric acid, lactic acid, glucono-delta-lactone, phosphoric acid, vinegar, and the like. Vinegar and lactic acid are the preferred edible acids.

Salt, as well as optional ingredients, can added to the cheese in the cooker as described above with respect to the method illustrated in FIG. 1. Moreover, animal- or plant-derived enzymes can, if desired, be added to the blend to for the dough as described above with respect to the method illustrated in FIG. 1. Likewise, the resulting cheese can be cooked and packaged as described above with respect to the method illustrated in FIG. 1. The addition of the optional enzymes and other optional ingredients is illustrated in FIG. 3.

The lactose content of conventionally prepared natural mozzarella cheese is traditionally fairy low; typically less than about 0.5 g per one ounce serving. As such, many conventionally prepared mozzarella cheeses can be labeled as "lactose free" and safely consumed by individuals with an intolerance to lactose. Additionally, low lactose levels in such cheeses provide functional benefits such as reduced browning in baking applications. Cheese produced by the methods of the present invention may be formulated to have similarly low levels of lactose by utilizing dairy ingredients which have been processed to remove, or reduce the levels of, lactose. Alternatively, lactose levels of the cheeses produced by the methods of this invention may also be reduced using lactase enzymes. For example, a yeast lactase (Valley Research Inc., South Bend, Ind.) can be added at a level of about 0.0001 to about 0.1 percent along with the dairy culture in order to reduce lactose levels. If used, such lactase enzymes would be incorporated into the composition before the cooking step; generally, it may be easier to disperse the lactase enzymes into the composition before the dough is formed.

Definitions

The definitions of a number of terms and phrases used in the present application are provided. As used herein, "dairy fat" relates to cream, liquid or anhydrous milkfat, butter, or mixtures thereof.

As used herein, "milk protein concentrate" relates to milk protein concentrates prepared using membrane ultrafiltration and/or microfiltration of skim (or whole) milk to remove water, lactose, and salts. Diafiltration with water may be used to further reduce lactose and salts. Similar concentrating techniques can also be used if desired. Essentially all of the casein and whey proteins (and fat, if present) are retained in the retentate by a ultrafiltration membrane with a 10,000 molecular weight cut-off. A microfiltration membrane with a pore size of about 0.1 microns will permit, under appropriate conditions, retention of most or essentially all of the casein in the retentate and passage of some of the whey protein into the permeate. For use in the present invention, such preferred retentate should contain casein and whey protein in the ratio of no more than about 85 to about 15. Therefore, microfiltration or a combination of microfiltration and ultrafiltration are preferred in the present invention. The retentate may be used in the wet state to make cheese, or it may be spray-dried to yield a shelf-stable powder which can be rehydrated for later use.

As used herein, "whey protein concentrate" relates to the proteins which are concentrated from whey (i.e., dairy liquid obtained as a supernatant of the curds when milk or a product containing milk components are curded to produce a semisolid cheese curd). Whey protein is generally understood to include principally the globular proteins β-lactoglobulin and α-lactalbumin; it also includes a significantly lower concentration of immunoglobulin and other globulins. Generally, such whey protein concentrates contain about 30 to about 70 percent protein (solid basis). Whey protein concentrate may be prepared from whey by processes such as ultrafiltration plus diafiltration wherein water and non-proteinaceous components such as lactose and minerals are removed. Alternatively, whey protein concentrates may be prepared from fluid whole or skim milk by processes such as microfiltration which permit the separation of caseins from whey proteins without the formation of a coagulum. As used herein, "whey protein isolates" are produced from whey in a manner similar to a whey protein concentrate but generally have a protein content of about 75 to about 95 percent (solid basis). For purposes of this invention, a whey protein content of a specified value refers to the fraction of total crude protein rather than the total composition; in other words, a whey protein content of less than about 15 percent means that, of the total protein content of the composition, less than 15 percent consists of whey protein.

As used herein, "relatively low shear" relates to shear values in the cooker which can achieve the desired texture of the resulting cheese. A typical device that can be used is a "laydown cooker" (e.g., Damrow, Fond du Lac, Wis.) having a single auger or twin-screw augers for mechanically working the cheese and steam jets for directly heating the cheese. Generally, the shear should be relatively low (i.e., less than about 100 sec$^{-1}$) since excessive shear can impair the texture of the resulting cheese. Generally, peak shear values of less than about 20 sec$^{-1}$ are acceptable and preferred for compositions containing insignificant levels of non-proteinaceous hydrocolloids and/or relatively low levels of total protein (i.e., less than about 20 percent). For compositions containing non-proteinaceous hydrocolloids and/or relatively high levels of total protein (i.e., greater than about 20 percent), peak shear levels of about 30 to about 50 sec$^{-1}$ are generally preferred. For example, the auger speed of a conventional pilot-plant scale laydown cooker with a capacity of about 40 lbs will generally be less than about 70 rpm, and more preferably about 50 to 60 rpm, to avoid excessive shear; of course, other sized cookers may require different operating conditions to avoid such excessive shear.

As used herein, "hydrocolloid gum" relates to any substance that can disperse in water to form a viscous, mucilaginous mass. Hydrocolloid gums are often used in food processing to stabilize emulsions, or as a thickener. The gum may be extracted from seeds (e.g., guar gum, locust, quince, psyllium), sap or exudates (gum arabic, karaya, tragacanth, ghatti, bassora or hog gum shiraz, mesquite, anguao) and seaweeds (agar, kelp, alginate, Irish moss) or they may be made from starch or cellulose (dextrins, methyl cellulose, carboxymethyl cellulose, and the like) or they may be synthetic, such as vinyl polymers.

As used herein, "preservative" relates to substances capable of retarding or arresting the deterioration of food. Suitable preservatives include, for example, sorbic acid, potassium sorbate, benzoic acid, other food-grade acids, salt, essential oils, natural anti-microbial substances (e.g., nisin, nystatin, cultured milk, cultured whey), and the like.

As used herein, "supplement" relates to essential dietary factors such as vitamins, minerals, amino acids, and the like.

As used herein, "condiment" relates to ingredients added to flavor food such as seasonings, spices, natural or artificial flavors, and the like.

The following examples are included to illustrate the invention and not to limit it. Unless otherwise indicated, all percentages are by weight.

EXAMPLE 1

Standardized and pasteurized heavy cream (16 lbs; about 43% milkfat) and water (5.7 lbs), both preheated to about 105° F., were mixed in a 25 gal Hobart mixer. DVS cultures (about 6.8 g each of LH32 and Stc4 from Chr. Hansen, Milwaukee, Wis.) were added. The resulting composition was stirred for about 1 minute at which time Nutrilac CH7813 (8.2 lbs; ARLA Foods, Skanderborgvej, Denmark) was added; stirring was continued for an additional 3 minutes to form a homogenous dough-like mass. A 27.7 lbs portion of the dough-like mass was incubated at about 110° F. After about 4 hours incubation, the pH dropped to about 5.48; at 4.5 hours, the pH dropped to 5.4.

The entire portion of the incubated dough was placed in a 40 lb capacity single auger, steam injected cheese cooker (i.e., laydown cooker). Water (0.65 lbs), salt (0.48 lbs), sodium carboxymethycellulose (0.06 lbs; Type 7MF, Hercules Chemical Comp., Wilmington, Del.), and tricalcium phosphate (0.19 lbs) were added. The auger was set at about 50 rpm and the temperature was raised to about 150° F. using steam. Approximately, ¾ of the mass was removed and then re-introduced into the cooker. The temperature was then raised to about 155° F. and mixing was continued for about 2 minutes. The cheese was then removed and hot-packed into 1 lb containers. The hot mass was homogenous and plastic with flavor and texture similar to melted low-moisture, part skim (LMPS) mozzarella cheese.

After storage at 45° F. for two weeks, the resulting cheese had flavor, texture, and melt characteristics similar to commercial LMPS mozzarella cheese. Using a Texture Analyzer (Stable Micro Systems, London, England) with a 45° stainless steel cone, a penetration depth of 1 cm, and a rate of 2 mm/sec, the penetration force was 612 g. The resulting cheese could be shredded at 45° using a tabletop food processor.

EXAMPLE 2

Anhydrous milkfat (melted; 20.5 lbs), water (25 lbs), and nonfat dry milk (2.6 lbs) were passed through a Dispax pump at 30 MHZ and then a Gaulin homogenizer at 2000 psi. The resulting emulsion (16 lbs) and water (15.1 lbs), both preheated to 105° F., were mixed as in Example 1. DVS cultures (about 6.8 g each of LH32 and Stc4 from Chr. Hansen, Milwaukee, Wis.) were added as in Example 1. Nutrilac CH7813 (8.9 lbs) was then added and mixed as in Example 1. A 28 lb portion of the resulting dough was then incubated at 110° F. until the pH fell to 5.4. The incubated dough, salt (0.48 lbs), and tricalcium phosphate (0.19 lbs) were added to a laydown cooker and cooked as described in Example 1. After storage for 6 days at 45° F., the resulting cheese was firm (Texture Analyzer force of 1009 g using the same procedure as Example 1) and has flavor, "chicken breast" fibrous texture, and melt characteristics similar to conventional mozzarella cheese.

EXAMPLE 3

Cream (109 lbs; about 40% milkfat) and water (35 lbs), both heated to about 105° F., were mixed in a ribbon mixer. DVS cultures (about 17 g of LH32 and about 17.5 g Stc4) as from Example 1 were added. The resulting composition was stirred for about 1 minute at which time Nutrilac CH7813 (about 61 lbs) was added; stirring continued for about 3 additional minutes to form a cultured dough. The dough was incubated for approximately 4 hours at about 110° F.; at the end of the incubation period, the pH dropped to about 5.4. A cultured dough aliquot (about 66 lbs) was removed to a 80 lb laydown cooker; salt (about 1.1 lb), sodium carboxymethylcellulose (about 0.35 lbs), and tricalcium phosphate (about 0.8 lb) were then added. The dough mixture was cooked as described in Example 1.

The resulting cheese was reheated to about 85° F. in a jacketed kettle and then fed to a pilot-scale twin-screw extruder fitted with a multi-strand die (48 holes with ⁵⁄₆₄ inch diameters). Extrusion feed rate was about 3.4 lb/min with an auger speed of about 20 rpm. The emerging strands spontaneously fractured into irregular length fragments (about 0.5 to about 1 inch in length). After cooling to about 45° F., a shredded cheese similar in both appearance and performance to conventionally prepared shredded mozzarella cheese was obtained.

EXAMPLE 4

This example illustrates the present invention using vinegar as the acidifying agent. Standardized and pasteurized heavy cream (about 32 lbs; about 40% milkfat) and water (about 11.5 lbs), both preheated to 105° F., were mixed in a 25 gal Hobart mixer. Chymax 2x (about 10 g; Chr. Hansen, Milwaukee, Wis.) was added. The resulting composition was stirred for about 1 minute at which time Nutrilac CH7813 (about 16.4 lbs) was added; stirring was continued for an additional 3 minutes to form a homogenous dough-like mass. An aliquot of the dough-like mass (about 27.8 lbs) was mixed with salt (about 0.5 lb) and vinegar (about 0.85 lbs) in a 40 lb capacity laydown cooker. This mixture was heated to about 150° F. by direct steam injection into the mass while mixing with an auger speed of about 50 rpm. At this point, about ⅔ of the mass was removed from the exit port of the cooker and recycled to the feed port. The mass was then heated to about 155° F. by direct steam injection and held at this temperature for about 2 minutes. The resulting cheese has a pleasant flavor similar to conventional vinegar-set mozzarella cheese. The resulting cheese had a pH of about 5.4, about 21.5 percent fat, about 51.3 percent moisture, and about 19.5 percent protein.

EXAMPLE 5

The procedure of Example 1 was repeated except a mixture of 6.69 lbs Nutrilac CH7813 and 1.6 lbs rennet casein (New Zealand Milk Products) was used as the milk protein concentrate (rather than the Nutrilac CH7813 of Example 1). The resulting cheese, after storage for two weeks at 45° F., was somewhat firmer than the cheese from Example 1 (about 659 g penetration force versus about 612 g for the Example 1 cheese) and had a slightly lower lactose content (about 1.7 percent versus about 1.9 percent for the Example 1 cheese).

EXAMPLE 6

The procedure of Example 1 was repeated except that a lactase enzyme (Validase yeast lactase; Valley Research Inc., South Bend, Ind.) was added at about 0.0005% along with the DVS cultures. The resulting cheese contained about 1.1 percent lactose as compared to about 1.7 to about 2.0 percent for similar cheeses prepared without using the lactase enzyme.

EXAMPLE 7

This examples illustrates the process shown in FIG. 2 wherein only the cream/water blend is cultured. Standardized and pasteurized heavy cream (about 15.34 lbs; about 41% milkfat) and water (about 5.4 lbs), both preheated to 90° F., were mixed in a 25 gal Hobart mixer. Chymax 2x (about 10 g; Chr. Hansen, Milwaukee, Wis.) was added. DVS culture (about 15.4 g R604 from Chr. Hansen, Milwaukee, Wis.) was added. The resulting composition was stirred for about 1 minute and then transferred to a sanitized can and incubated at 86° F. for 2.5 hour., whereupon the pH had dropped to about 4.8. At this time, the mixture was replaced in the Hobart mixer and Nutrilac CH7813 (9.2 lbs; ARLA Foods, Skanderborgvej, Denmark) was added; stirring was continued for an additional 3 minutes to form a homogenous dough-like mass. A 27.9 lbs portion of the dough was added with salt (about 0.5 lb), lactic acid (about 39 gm., 88% acid), sodium carboxymethycellulose (Type 7MF, Hercules Chemical Comp., Wilmington, Del.), and tricalcium phosphate (0.19 lbs) to a 40 lbs capacity single auger, steam injected cheese cooker (i.e., laydown cooker). The auger was set at about 50 rpm and the temperature was raised to about 150° F. using steam. Approximately, ¾ of the mass was removed and then re-introduced into the cooker. The mass was then heated to about 155° F. by direct steam injection and held at this temperature for about 2 minutes. The resulting cheese has a pleasant flavor similar to conventional cultured mozzarella cheese. The resulting cheese had a pH of about 5.5, about 19.8 percent fat, about 48.6 percent moisture, about 22.6 percent protein, and about 4.3 percent lactose.

What is claimed is:

1. A method for preparing mozzarella cheese from dry dairy ingredients, said method comprising:
   (1) mixing water and a dairy fat to form a first blend;
   (2) adding a lactic acid-producing culture to the first blend to form a second blend;
   (3) mixing a dry dairy ingredient with the second blend to form a cultured dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(4) incubating the cultured dough at a temperature and for a time sufficient to obtain a pH of about 5.2 to about 5.8;

(5) mechanically working and cooking the cultured dough from step (4) in a cooker at a temperature of about 150 to about 175° F. and under relatively low shear conditions to form the mozzarella cheese; and (6) collecting the mozzarella cheese,
wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process.

2. The method of claim 1, wherein the incubation temperature is about 95 to about 120° F. if the lactic acid-producing culture is thermophilic or about about 65 to about 95° F. if the lactic acid-producing culture is mesophilic and wherein the dry dairy ingredient comprises the milk protein concentrate or the blend of the milk protein concentrate and up to about 20 percent of the second dry dairy ingredient.

3. The method of claim 2, wherein the dry dairy ingredient is the milk protein concentrate.

4. The method of claim 2, wherein the dry dairy ingredient consists essentially of about 80 to 100 percent the milk protein concentrate and 0 to about 20 percent of the second dry dairy ingredient.

5. The method of claim 1, wherein the mozzarella cheese from step (5) is cooled to about 80 to about 120° F. and then extruded into a desired shape or into shreds prior to being collected.

6. The method of claim 2, wherein the mozzarella cheese from step (5) is cooled to about 80 to about 120° F. and then extruded into a desired shape or into shreds prior to being collected.

7. The method of claim 1, wherein a lactase enzyme is included in the cultured dough to reduce the lactose level of the mozzarella cheese.

8. The method of claim 2, wherein a lactase enzyme is included in the cultured dough to reduce the lactose level of the mozzarella cheese.

9. The method of claim 7, where the lactase enzyme is present at about 0.0001 to about 0.1 percent.

10. The method of claim 8, where the lactase enzyme is present at about 0.0001 to about 0.1 percent.

11. The method of claim 1, wherein a proteolytic enzyme is included in the first or second blend.

12. The method of claim 2, wherein a proteolytic enzyme is included in the first or second blend.

13. A method for preparing mozzarella cheese from dry dairy ingredients, the method comprising:

(1) mixing water and a dairy fat to form a first blend;

(2) adding a lactic acid-producing culture to the first blend to form a second blend;

(3) incubating the second blend at a temperature and for a time sufficient to obtain a pH of about 4 to about 5 to form a cultured second blend;

(4) mixing a dry dairy ingredient with the cultured second blend to form a dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(5) mechanically working and cooking the dough from step (4) in a cooker at a temperature of about 150 to about 175° F. and under relatively low shear conditions while adding sufficient edible acid to adjust the pH to about 5.2 to about 5.8 to form the mozzarella cheese; and (6) collecting the mozzarella cheese,
wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process.

14. The method of claim 13, wherein the incubation temperature is about 95 to about 120° F. if the lactic acid-producing culture is thermophilic or about about 65 to about 95° F. if the lactic acid-producing culture is mesophilic and wherein the dry dairy ingredient comprises the milk protein concentrate or the blend of the milk protein concentrate and up to about 20 percent of the second dry dairy ingredient.

15. The method of claim 14, wherein the dry dairy ingredient is the milk protein concentrate.

16. The method of claim 14, wherein the dry dairy ingredient consists essentially of about 80 to 100 percent the milk protein concentrate and 0 to about 20 percent of the second dry dairy ingredient.

17. The method of claim 13, wherein the mozzarella cheese from step (5) is cooled to about 80 to about 120° F. and then extruded into a desired shape or into shreds prior to being collected.

18. The method of claim 14, wherein the mozzarella cheese from step (5) is cooled to about 80 to about 120° F. and then extruded into a desired shape or into shreds prior to being collected.

19. The method of claim 13, wherein a lactase enzyme is included in the first or second blend to reduce the lactose level of the mozzarella cheese.

20. The method of claim 14, wherein a lactase enzyme is included in the first or second blend to reduce the lactose level of the mozzarella cheese.

21. The method of claim 19, where the lactase enzyme is present at about 0.0001 to about 0.1 percent.

22. The method of claim 20, where the lactase enzyme is present at about 0.0001 to about 0.1 percent.

23. The method of claim 13, wherein a proteolytic enzyme is included in the first or second blend.

24. The method of claim 14, wherein a proteolytic enzyme is included in the first or second blend.

25. A method for preparing mozzarella cheese from dry dairy ingredients, said method comprising:

(1) mixing water and a dairy fat to form a blend;

(2) mixing a dry dairy ingredient with the blend to form a dough, wherein the dry dairy ingredient comprises a milk protein concentrate or a blend of the milk protein concentrate and up to about 50 percent of a second dry dairy ingredient selected from the group consisting of whey protein concentrate, whey protein isolate, calcium caseinate, sodium caseinate, rennet casein, acid casein, nonfat dry milk, and mixtures thereof, and wherein the milk protein concentrate has a solubility of greater than about 50 percent and a whey protein content of less than about 15 percent;

(3) mechanically working and cooking the dough in a cooker at a temperature of about 150 to about 175° F.

and under relatively low shear conditions while adding sufficient edible acid to adjust the pH to about 5.2 to about 5.8 to form the mozzarella cheese; and (4) collecting the mozzarella cheese, wherein the process does not include the formation of whey, wherein the mozzarella cheese does not contain significant levels of added emulsifying salts, and wherein the mozzarella cheese has texture and organoleptic properties comparable to a natural mozzarella cheese prepared in a conventional mozzarella process.

26. The method of claim 25, wherein the dry dairy ingredient comprises the milk protein concentrate or the blend of the milk protein concentrate and up to about 20 percent of the second dry dairy ingredient.

27. The method of claim 25, wherein the dry dairy ingredient is the milk protein concentrate.

28. The method of claim 25, wherein the dry dairy ingredient is the blend of the milk protein concentrate and up to about 20 percent of the second dry dairy ingredient.

29. The method of claim 25, wherein the edible acid is vinegar or lactic acid.

30. The method of claim 26, wherein the edible acid is vinegar or lactic acid.

31. The method of claim 25, wherein a lactase enzyme is included in the dough to reduce the lactose level of the mozzarella cheese.

32. The method of claim 27, wherein a lactase enzyme is included in the dough to reduce the lactose level of the mozzarella cheese.

33. The method of claim 31, where the lactase enzyme is present at about 0.0001 to about 0.1 percent.

34. The method of claim 32 where the lactase enzyme is present at about 0.0001 to about 0.1 percent.

35. The method of claim 25, wherein a proteolytic enzyme is included in the blend.

36. The method of claim 29, wherein a proteolytic enzyme is included in the blend.

* * * * *

UNITED STATES PATENT AND TRADEMARK OFFICE
CERTIFICATE OF CORRECTION

PATENT NO.     : 6,372,268 B1
DATED          : April 16, 2002
INVENTOR(S)    : Richard S. Silver et al.

It is certified that error appears in the above-identified patent and that said Letters Patent is hereby corrected as shown below:

Column 15,
Line 17, delete "about" (second occurrence).
Line 25, delete "the".

Column 16,
Line 18, delete "about" (second occurrence).
Line 27, delete "the".

Signed and Sealed this

Third Day of December, 2002

JAMES E. ROGAN
*Director of the United States Patent and Trademark Office*